United States Patent Office 3,066,404
Patented Dec. 4, 1962

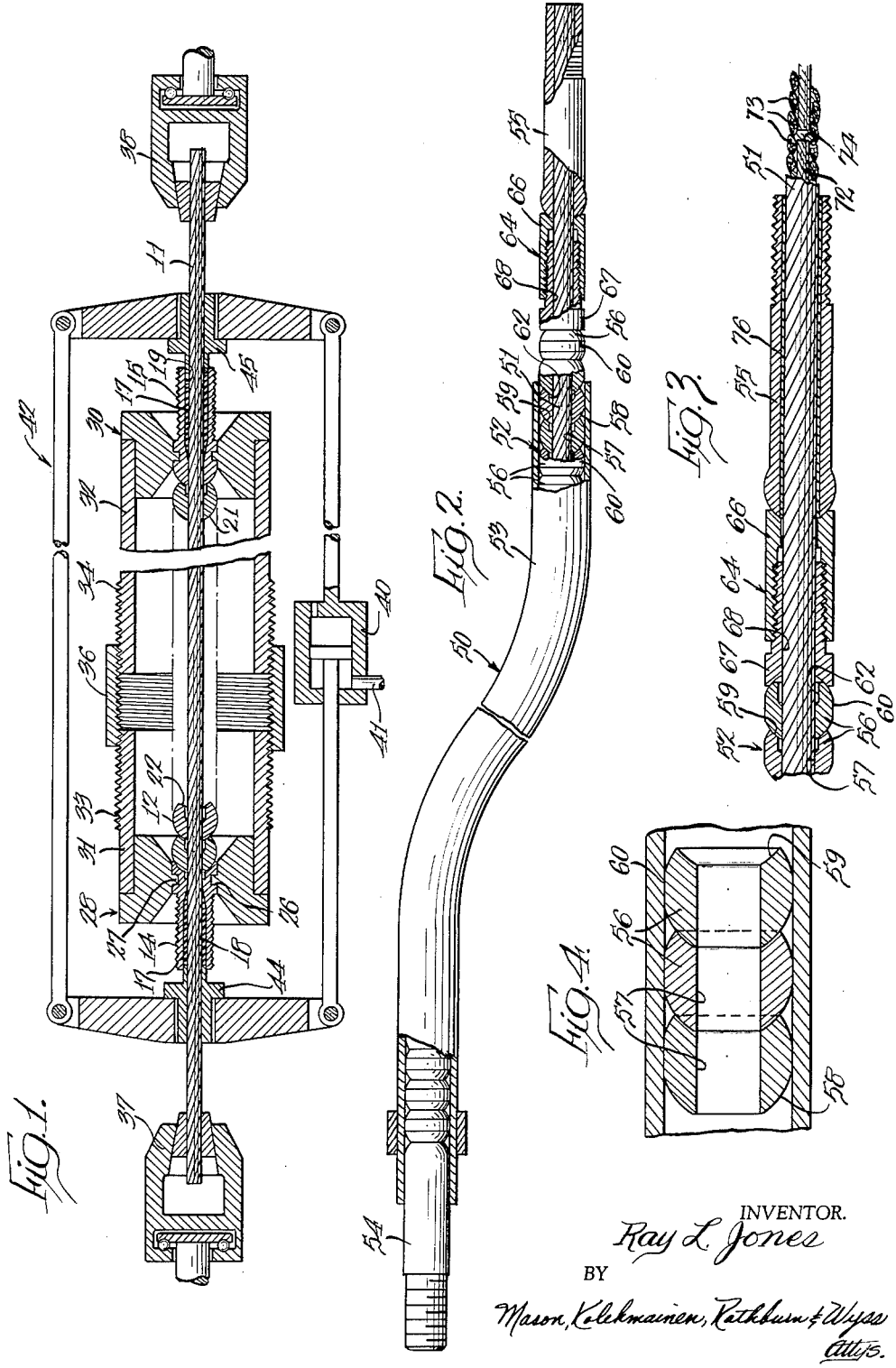

3,066,404
METHOD AND APPARATUS FOR PRESTRESSING A REMOTE POWER LINEAR DRIVE
Ray L. Jones, Redondo Beach, Calif., assignor, by mesne assignments, to Ultradyne, Incorporated, Albuquerque, N. Mex., a corporation of New Mexico
Filed Apr. 3, 1957, Ser. No. 650,352
5 Claims. (Cl. 29—452)

The present invention relates to remote power linear drives, and, more particularly, to linear drive push-pull cables which are adapted to transmit compressive or tensile forces over non-rectilinear paths.

Push-pull cables of this type ordinarily comprise a pair of concentrically arranged force transmitting, transversely flexible members, the inner member being the tensile force transmitting member and the outer member being the compressive force transmitting member, this latter member usually comprising a composite sleeve consisting of a series of interfitting balls or shells of suitable rigidity to withstand the desired compressive load. The tensile force transmitting member is normally in the form of a multiple lay stranded cable. However, such multi-strand cables have the disadvantage that they undergo a so-called constructional stretch, which is a function of both load and time.

With this constructional stretch and upon the application of a tensile load, the shells of the compressive force transmitting member tend to separate and become cocked at an angle to the outer casing of the cable with the result that galling and excessive wear are produced and the life of the cable is substantially reduced.

It is, therefore, an object of the present invention to provide a new and improved method of manufacturing a remote power linear drive.

Another object of the present invention is to provide a new and improved method of preloading a linear drive push-pull cable so as to appreciably reduce if not altogether eliminate constructional stretch of the tensile member.

A further object of the present invention is to provide a new and improved remote power linear drive employing a substantially stretchless twisted cable tension member.

Another object of this invention is to provide a new and improved method for manufacturing a push-pull cable so as to eliminate constructional stretch therein.

Still another object of the present invention is to provide a new and improved push-pull cable which is preloaded to prevent separation of the compressive force transmitting members.

Briefly, the above and further objects are realized in accordance with the present invention by providing a remote power linear drive push-pull cable comprising as its principal elements a central, twisted-strand cable positioned within a multi-element compressive force transmitting sleeve, the cable and sleeve being preloaded to the desired value and enclosed in a tubular outer casing. This preloading is obtained by taking up the slack between the force transmitting elements while the cable is under a tension preload preferably greater than the tension load to which the cable is subjected in use. In order to prevent constructional stretch and thereby to maintain a preload on the tension member during use, the tension member is preloaded, during the manufacturing process, while supported in such a manner as to be freely rotatable at at least one end.

The multi-strand central cable may comprise a central lay of twisted strands about which a plurality of additional lays are twisted. When such a cable is preloaded with a tensile force, the central lay is necessarily stretched a greater amount than are the outer lays and may, in some instances, actually break. In accordance with another aspect of the invention, therefore, when such cables are preloaded, the central lay is severed and the outer lays are partially preloaded, while the entire cable is free to rotate. This causes the outer lays to be stretched and also compressed against the central lay. Thereafter, all of the lays, including the central lay, are preloaded to the maximum preload force, the entire cable still being free to rotate. In this manner, all of the lays are preloaded with substantially equal tensile forces while substantially eliminating constructional stretch in the completed cable. By thus utilizing the method of the present invention there is provided a push-pull cable which has a relatively long life, which accurately transmits linear movement from one place to another under high temperature conditions, and which may be used at its maximum capacity thereby to minimize its required weight. This latter feature is particularly important when the cable is used in aircraft control applications.

The invention, both as to its organization and method of operation, together with further objects and advantages thereof, will best be understood by reference to the following detailed description taken in connection with the accompanying drawings, in which:

FIG. 1 is a cross-sectional view of a remote power linear drive cable mounted in a preloading jig during the manufacture of the cable in accordance with the principles of the present invention;

FIG. 2 is an elevational view, partly broken away, of a complete push-pull cable embodying certain aspects of the present invention;

FIG. 3 is an enlarged sectional view of one end of the cable of FIG. 2; and

FIG. 4 is a fragmentary sectional view taken along the longitudinal axis of the cable of FIG. 2 and on a somewhat larger scale.

Referring now to the drawings, and particularly to FIG. 1 thereof, there is shown the tension and compression components of a remote power linear drive mounted in a preloading jig. These components comprise a multiple lay twisted-strand cable 11 for transmitting tensile forces, and a plurality of contiguously arranged semi-spherical members 12 which surround the cable 11 and together constitute a composite flexible sleeve for transmitting compressive forces. A pair of threaded terminal bushings 14 and 15 are respectively provided on opposite ends of the sleeve 12 and are secured to the cable 11 by means of cylindrically shaped swaging sleeves 17 which are compressed between the cable 11 and the walls of the respective bores 18 and 19 of the terminal bushings 14 and 15.

The cable 11 is slidably received within central bores of the individual members 12 and transverse flexibility of the composite sleeve structure is provided by means of ball and socket joints provided between the individual members 12. To this end, each member 12 has a spherical convex portion 21 at one end, and a similar concave portion 22 at the opposite end. The center cable 11 and the members 12 are preloaded before they are fixedly secured together by means of the terminal members 14 and 15, this preloading force being preferably greater than the forces to be transmitted by the push-pull cable during use, i.e., the rated load of the cable.

In accordance with an important feature of the present invention, constructional stretch of the center cable 11 is substantially eliminated by allowing the center cable 11 to freely rotate during the application thereto of a preloading tensile stress. More particularly, the stranded cable 11 is threaded through the central bores of the members 12 and through the bushings 14 and 15 which are each provided with an annular groove 26 for the reception of semi-annular flanges 27 on two sets of jaws 28 and 30. The jaws 28 and 30 are respectively positioned in tubular members 31 and 32 which are adapted to be rigidly connected together by means of a connecting sleeve 36 during the swaging operation, as will be described in more detail hereinafter.

When the cable is first placed in the preloading jig the sleeve 36 is threaded back onto one of the members 31 and 32 so as not to connect the members 31 and 32 and the ends of the cable 11 are then gripped in the jaw elements of freely rotatable jaws 37 and 38 between which is exerted by any suitable means (not shown) a tensile force which tends to stretch the cable 11. This tensile force may be approximately 25 percent greater than the tensile force to be exerted on the member 11 during use of the cable, but, if desired, a greater preload stress may be applied thereto. This preload force may also be applied in increments and maintained for predetermined times. While the cable is held in tension by the jaws 37 and 38, a piston and cylinder means 40 is actuated by the application thereto of a fluid through the inlet 41 which acts through the linkage arrangement 42 and a pair of swaging collars 44 and 45, respectively, to force the sleeves 17 of soft swaging material into the bores of the terminal bushings 14 and 15 towards the inner end of the bore which, as shown, is of reduced cross-sectional area. The swaging material 17, which may be formed of lead, tin, or the like, is thus pressed into the bushings 14 and 15 and a compression preload force is transmitted therethrough to the members 12.

After the desired compression preload force has been applied to the members 12, the sleeve 36 is threaded onto both of the sleeves 31 and 32 to connect them rigidly together and prevent further compression preload on the members 12. A substantially greater compression force is then exerted through the linkage 42 and the collars 44, 45 on the swaging sleeves 17 so that the sleeves 17 cold flow into the spaces between the strands of the cable 11 and fixedly secure the bushings 14 and 15 to the cable 11. The members 11 and 12 are then removed from the fixture, the center cable 11 is severed at the ends of the terminal bushings 14 and 15, and the assembly is inserted into an outer tube having preformed bends therein in accordance with the path over which the force is to be transmitted by the members 11 and 12.

Referring to FIGS. 2 to 4, inclusive, there is disclosed a push-pull cable 50 embodying further features of the present invention. The cable 50 comprises as its principal elements a multiple lay twisted strand cable 51 for transmitting tensile forces and a composite sleeve 52 for transmitting compressive forces, similar to the elements 11 and 12 of FIG. 1, and a preformed rigid tube 53 for receiving the reactive forces. Since the tube 53 is rigid, it provides a protective housing for the stranded cable 51 and the composite sleeve 52, and in addition, guides the transversely flexible force transmitting members 51 and 52 between the driving and driven members of the system in which the cable 50 is connected. Connection of the push-pull cable 50 in a system is facilitated by means of the terminal bushings 54 and 55 which are fixedly connected to the adjoining ends of the members 51 and 52.

The composite sleeve 52 consists of a plurality of individual members 56 having axial bores 57 through which the cable 51 extends. Transverse flexibility of the composite sleeve 52 is provided by means of ball and socket joints between the individual members 56 each member having a spherical convex portion 58 at one end and a similar concave portion 59 at the opposite end. Since the composite sleeve 52 moves along the tube 53 as linear movement is transmitted from one of the bushings 14 or 15 to the other, the inner wall of the tube 53 is preferably very smooth, and in order to distribute bearing load and reduce unit bearing stress and further to prevent the individual members 56 from cocking in the tube 53, the members 56 are each provided with a longitudinally directed cylindrical outer surface 60 having a diameter which is only slightly less than the internal diameter of the tube 53. Moreover, in order to prevent galling, the inner wall of the tube 53 is preferably substantially harder than the contiguous surfaces of the members 56.

The terminal bushing 54 is operatively similar to the bushing 14 of FIG. 1 but the push-pull cable 50 differs from that of FIG. 1 principally in the way in which it is preloaded and because it includes a preload force adjusting assembly 64 (FIG. 3) which is interposed between the last member 56 and the terminal bushing 55. The assembly 64 comprises an internally threaded sleeve 66 into which is threaded a headed screw 67 which has a central bore 68 therein through which the cable 51 passes. It will be apparent that relative rotation of the members 66 and 67 of the assembly 64 varies the compression load on the members 56 and, therefore, may be used to adjust the compression preload on the cable 50.

In accordance with an important feature of the present invention, in manufacturing the push-pull cable 50, the cable 51 is threaded through the shells 56, the adjusting assembly 64, and the bushings 54 and 55. The stranded cable 51 is of the type which comprises a central lay of strands 72, surrounded by a plurality of outer lays 73 which are twisted about the central lay 72, and the outer lays 73 of the cable 51 are pushed aside to give access to the central lay 72. The central lay 72 is then severed, as indicated at 74 in FIG. 3, externally of the terminal bushing 55. A tensile preload force, of about one-half that of the total preload force to be applied to the cable, is then exerted on the cable 51 by engaging the cable 51 externally of the break 74 by any suitable means such as the jaws 38 of FIG. 1 so that the cable 51 is free to rotate during application of this initial tensile preload. In this manner all but the center lay 72 of the cable 51 is partially preloaded. With the partial preload force still exerted on the cable 51 externally of the break 74, the cable 51 is engaged by another rotatable set of jaws between the terminal bushing 55 and the break 74 in the center lay 72. To remove constructional stretch substantially entirely a relatively large preload tensile force, which may be in the order of 2000 lbs. in the case of 7 x 19 aircraft cable, is then applied to all of the lays of the cable 51 through this latter connection. Accordingly, the additional preload force is also exerted on the center lay 72 which extends through the connector 55. This maximum tensile preload is held for a predetermined period of time such, for example, as one minute or more. The tensile load on the cable 51 externally of the break 74 is then released so that corresponding preload compressive force is applied between the terminals 55 and 54. A preload force which is lower than the above mentioned 2000 lbs. but greater than the normal maximum tension load on the assembly, is applied and the assembly 64 is adjusted by unscrewing the screw 67 from the sleeve 66 until a tight fit is provided between the members 56 throughout the length of the cable 50. Tapered swaging sleeves 76 are then compressed into the terminal bushings 54 and 55, by any suitable means such as described above in connection with FIG. 1, to fixedly secure these bushings to the center cable 51. The cable 51 is then severed adjacent the ends of the terminal bushings 54 and 55 and after it has been inserted into the outer tube 53 the push-pull cable is completed.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. The method of making a remote power linear drive of the type having a stranded cable tension member and a composite sleeve compression member composed of a plurality of individual abutted annular segments, which comprises the steps of preloading said cable tension member while permitting freedom of rotation of said cable tension member about its longitudinal axis to minimize the constructional stretch thereof, and securing said tension member to said compression member at respectively spaced apart locations on said members to maintain said preload thereon.

2. The method of manufacturing a remote power linear drive of the type having a twisted stranded cable positioned within a transversely flexible composite sleeve composed of a plurality of individual abutted annular segments comprising the steps of threading said cable through said sleeve, applying a tensile stress to said cable while permitting freedom of rotation of said cable about its principal longitudinal axis to minimize the constructional stretch thereof, and securing said cable at spaced apart locations thereof to said sleeve while said tensile stress is applied, said stress being at least equal to the working tensile load of said linear drive when in use.

3. The method of manufacturing a remote power linear drive of the type having a multi-lay stranded cable disposed within a flexible composite sleeve composed of a plurality of individual abutted annular segments, which comprises the steps of threading said cable through said sleeve, applying an initial tensile preload to the outer lays only of said cable while permitting said cable to rotate freely about the longitudinal axis thereof to minimize the construction stretch thereof, applying a greater tensile preload to all of the lays of said cable while permitting said cable to rotate freely about the longitudinal axis thereof to minimize constructional stretch of said cable when in use, and securing the ends of said sleeve to said cable to maintain said preload thereon.

4. A preloading jig for assembling and preloading a remote power linear drive of the type having a multi-strand central cable positioned within a flexible composite sleeve, comprising means for applying a tensile force to the ends of said cable while permitting said cable to rotate freely about the longitudinal axis thereof to minimize constructional stretch of said cable during use, means for applying a compression force to the ends of said composite sleeve, and means for securing the ends of said composite sleeve to said cable while said compression tensile force is applied to said cable and said force is exerted on said sleeve.

5. A preloading jig for assembling and preloading a remote power linear drive of the type having a multi-strand central cable positioned within a flexible composite sleeve, said sleeve including a plurality of interfitting compression force transmitting members and a pair of tubular end terminals, comprising means for applying a tensile force to the ends of said cable while permitting said cable to rotate freely about the longitudinal axis thereof to minimize constructional stretch of said cable during use, means for applying a compression force to said end terminals of said sleeve, means for rigidly connecting said end terminals together, and means for securing said end terminals to said cable by forcing swaging material into the space between said end terminals and said cable while maintaining said rigid connection between said end terminals to prevent further compression loading on said interfitting members.

References Cited in the file of this patent

UNITED STATES PATENTS

| | | |
|---|---|---|
| Re. 15,805 | Guay | Apr. 1, 1924 |
| 1,279,208 | Wright et al. | Sept. 17, 1918 |
| 1,723,752 | Underwood | Aug. 6, 1929 |
| 1,772,453 | Bosworth | Aug. 12, 1930 |
| 1,906,782 | Zaff | May 2, 1933 |
| 2,241,283 | Wackerle | May 6, 1941 |
| 2,441,719 | Potter | May 18, 1948 |
| 2,453,079 | Rossmann | Nov. 2, 1948 |
| 2,622,314 | Bergan | Dec. 23, 1952 |

FOREIGN PATENTS

| | | |
|---|---|---|
| 126,246 | Switzerland | June 1, 1928 |
| 267,451 | Switzerland | June 16, 1950 |
| 755,723 | France | Sept. 11, 1933 |